United States Patent
Matsui et al.

(10) Patent No.: US 9,459,517 B2
(45) Date of Patent: Oct. 4, 2016

(54) PROJECTION IMAGE DISPLAY APPARATUS FOR ATTACHING AND DETACHING A PROJECTION LENS

(75) Inventors: Nobuki Matsui, Hitachi (JP); Shinro Inui, Ibaraki (JP); Chohei Ono, Ibaraki (JP); Kazuomi Kaneko, Hitachi (JP); Masayuki Fukui, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 124 days.

(21) Appl. No.: 14/356,224

(22) PCT Filed: Nov. 11, 2011

(86) PCT No.: PCT/JP2011/006309
§ 371 (c)(1),
(2), (4) Date: May 5, 2014

(87) PCT Pub. No.: WO2013/069065
PCT Pub. Date: May 16, 2013

(65) Prior Publication Data
US 2014/0313492 A1      Oct. 23, 2014

(51) Int. Cl.
*G02B 7/14*   (2006.01)
*G02B 7/16*   (2006.01)
(Continued)

(52) U.S. Cl.
CPC ............ *G03B 21/142* (2013.01); *G02B 7/022* (2013.01); *G02B 7/14* (2013.01); *G02B 7/16* (2013.01); *G03B 21/147* (2013.01)

(58) Field of Classification Search
CPC .......... G02B 7/022; G02B 7/14; G02B 7/16; G03B 21/142; G03B 21/147
See application file for complete search history.

(56) References Cited

U.S. PATENT DOCUMENTS

| 6,364,491 B1 | 4/2002 | Okada et al. |
| 6,452,733 B2 * | 9/2002 | Verbiest .................. G02B 7/14 359/827 |

(Continued)

FOREIGN PATENT DOCUMENTS

| CN | 100592186 | 2/2010 |
| JP | 2001-166380 A | 6/2001 |

(Continued)

OTHER PUBLICATIONS

Taiwanese Office Action for Taiwanese Patent Application No. 101139248, issued on Mar. 5, 2014.

*Primary Examiner* — Bao-Luan Le
(74) *Attorney, Agent, or Firm* — Baker Botts L.L.P.

(57) ABSTRACT

A projection image display apparatus which performs an operation for attaching and detaching a projection lens by one action with a simple mechanism is provided. The projection image display apparatus includes an optical engine which irradiates a display element with light emitted from a light source to form an image, a projection lens which enlarges and projects the image emitted from the optical engine, a lens shift mechanism for adjusting a position of an image to be projected onto a screen, a lens attachment unit for attaching the projection lens to the lens shift mechanism, and a first plate for attaching the projection lens to the lens attachment unit to achieve a locked state, and the attachment of the projection lens to the lens attachment unit and the achievement of the locked state are performed by only rotation of the first plate in a first direction. Also, detachment of the projection lens and release of the locked state are performed by only rotation of the first plate in a second direction opposite to the first direction.

2 Claims, 9 Drawing Sheets

(51) Int. Cl.
*G03B 21/14* (2006.01)
*G02B 7/02* (2006.01)

(56) References Cited

U.S. PATENT DOCUMENTS

| | | | |
|---|---|---|---|
| 6,778,340 B2* | 8/2004 | Hoshide | G03B 21/14 359/702 |
| 6,909,560 B2* | 6/2005 | Lin | G02B 7/023 359/694 |
| 7,165,848 B2* | 1/2007 | Gishi | H04N 9/3141 348/E5.141 |
| 7,954,964 B2* | 6/2011 | Kitahara | G03B 21/00 353/101 |
| 2004/0027692 A1* | 2/2004 | Hoshide | G03B 21/14 359/827 |
| 2005/0030492 A1* | 2/2005 | Gishi | H04N 9/3141 353/101 |
| 2005/0083585 A1* | 4/2005 | Lin | G02B 7/023 359/694 |
| 2007/0133109 A1* | 6/2007 | Kuroki | G02B 7/14 359/819 |
| 2008/0252995 A1 | 10/2008 | Wei et al. | |
| 2009/0185145 A1* | 7/2009 | Kitahara | G03B 21/00 353/101 |

FOREIGN PATENT DOCUMENTS

| | | |
|---|---|---|
| JP | 2001-207712 A | 8/2001 |
| JP | 2004-133358 A | 4/2004 |
| JP | 2010-72456 A | 4/2010 |
| JP | 2010-78776 A | 4/2010 |

* cited by examiner

PROJECTION IMAGE DISPLAY APPARATUS FOR ATTACHING AND DETACHING A PROJECTION LENS

TECHNICAL FIELD

The present invention relates to a projection image display apparatus.

BACKGROUND ART

In a projection display apparatus such as a liquid crystal projector, a display element such as a liquid crystal panel is irradiated with light emitted from a light source such as a mercury lamp, and an image formed on the display element is enlarged and projected onto a screen through a projection lens.

A configuration of an optical system in the apparatus includes an optical unit (hereinafter referred to as an optical engine) which irradiates a liquid crystal panel with light emitted from a light source to form an image and a projection optical system which enlarges and projects the image formed on the liquid crystal panel through a projection lens. An optical engine in a color image display apparatus is provided with three liquid crystal panels for the three primary colors (RGB) as display elements, a color separating system for separating the colors of irradiation light, and a color synthesizing system for synthesizing the colors of an image. The projection optical system is provided with a lens shift mechanism for moving the projection lens in a direction perpendicular to an optical axis in order to adjust an image display position on a screen.

Here, as a method for fixing the projection lens so as not to easily move, a technique in which a lock plate is moved in an optical axis direction to perform a locking operation is disclosed (see Patent Document 1).

PRIOR ART DOCUMENTS

Patent Documents

Japanese Patent Application Laid-Open Publication No. 2010-078776

SUMMARY OF THE INVENTION

Problems to be Solved by the Invention

According to Patent Document 1, in order to detach a projection lens, after a tab of a lock plate is once moved in an optical axis direction to release a lock, a lens fixing plate needs to be rotated in a detachment direction, and this makes the user's operation complicated. However, when it is tried to ensure the operability of a user, a large space has to be provided around the tab, and this causes a problem that the size of a set increases and the structure of the set becomes complicated. Further, there is also a problem that the number of components increases, which leads to the cost increase.

Therefore, an object of the present invention is to provide a projection image display apparatus capable of attaching and detaching a projection lens with a simple mechanism.

MEANS FOR SOLVING THE PROBLEMS

For the solution of the above-mentioned problems, one of desirable aspects of the present invention is as follows. The projection image display apparatus includes an optical engine which irradiates a display element with light emitted from a light source to form an image, a projection lens to enlarge and project the image emitted from the optical engine, a lens shift mechanism for adjusting a position of an image projected onto a screen, a lens attachment unit for attaching the projection lens to the lens shift mechanism, and a first plate for attaching the projection lens to the lens attachment unit to achieve a locked state, and the attachment of the projection lens to the lens attachment unit and the achievement of the locked state are performed by only rotation of the first plate in a first direction. Also, detachment of the projection lens and release of the locked state are performed by only rotation of the first plate in a second direction opposite to the first direction.

EFFECTS OF THE INVENTION

According to the present invention, it is possible to provide a projection image display apparatus capable of attaching and detaching a projection lens with a simple mechanism.

BRIEF DESCRIPTIONS OF THE DRAWINGS

BEST MODE FOR CARRYING OUT THE INVENTION

An embodiment will be described below with reference to the drawings.

Figure 1:
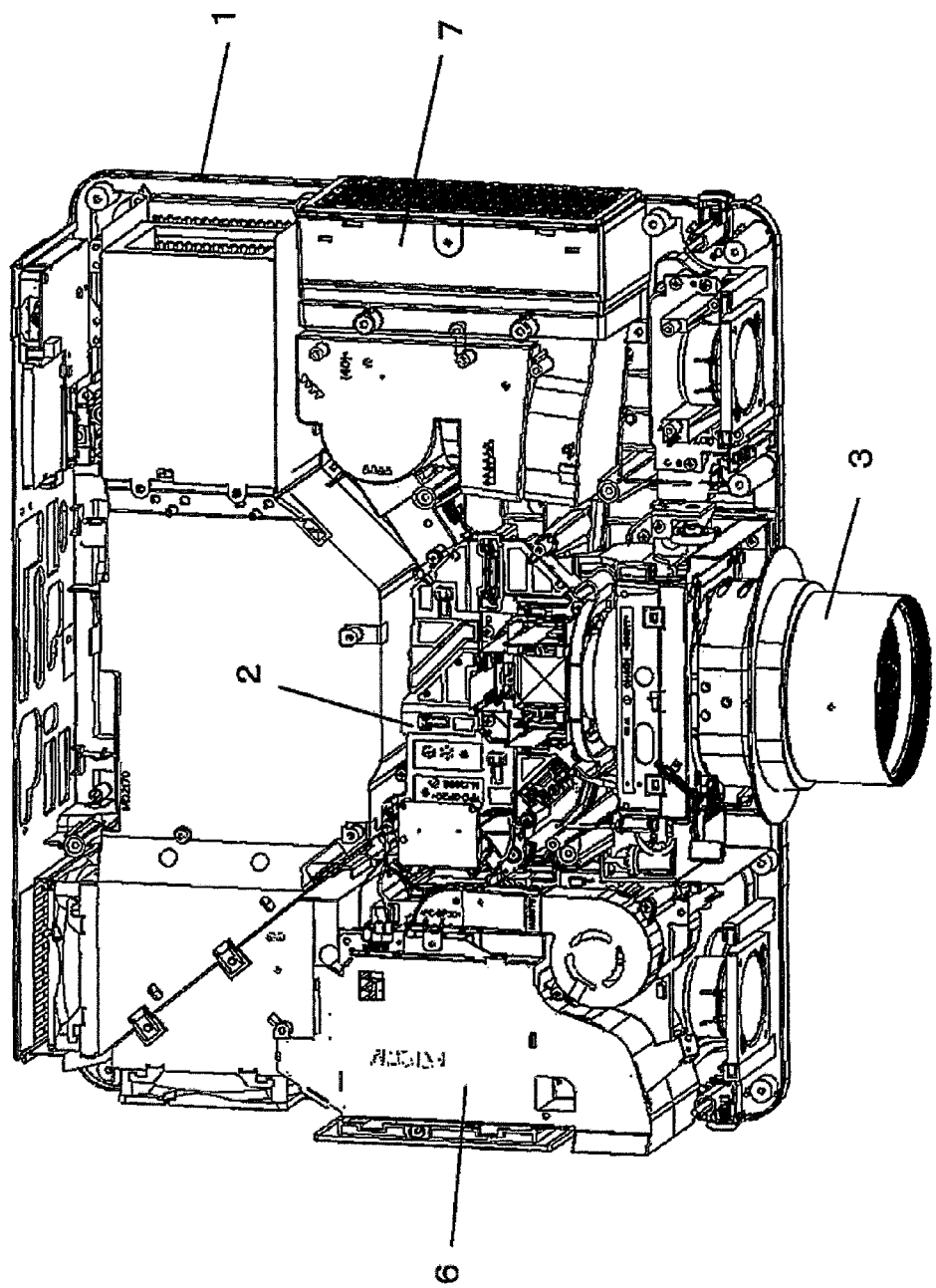
FIG. 1 is a diagram showing an overall configuration of a projection image display apparatus according to the present embodiment.

FIG. 1 is a diagram showing an overall configuration of a projection image display apparatus according to the present embodiment. More specifically, an internal configuration of the display apparatus is shown by removing an upper cover of a housing. The housing 1 houses an optical engine 2 in which light is emitted from a light source and a liquid crystal panel serving as a display element is irradiated with the light to form an image and a projection optical system 3 which enlarges and projects the image formed on the liquid crystal panel through a projection lens. In addition, a power supply unit 6, a cooling unit 7, an image signal circuit (not shown) and a control circuit (not shown) are housed in the housing 1.

Figure 2:
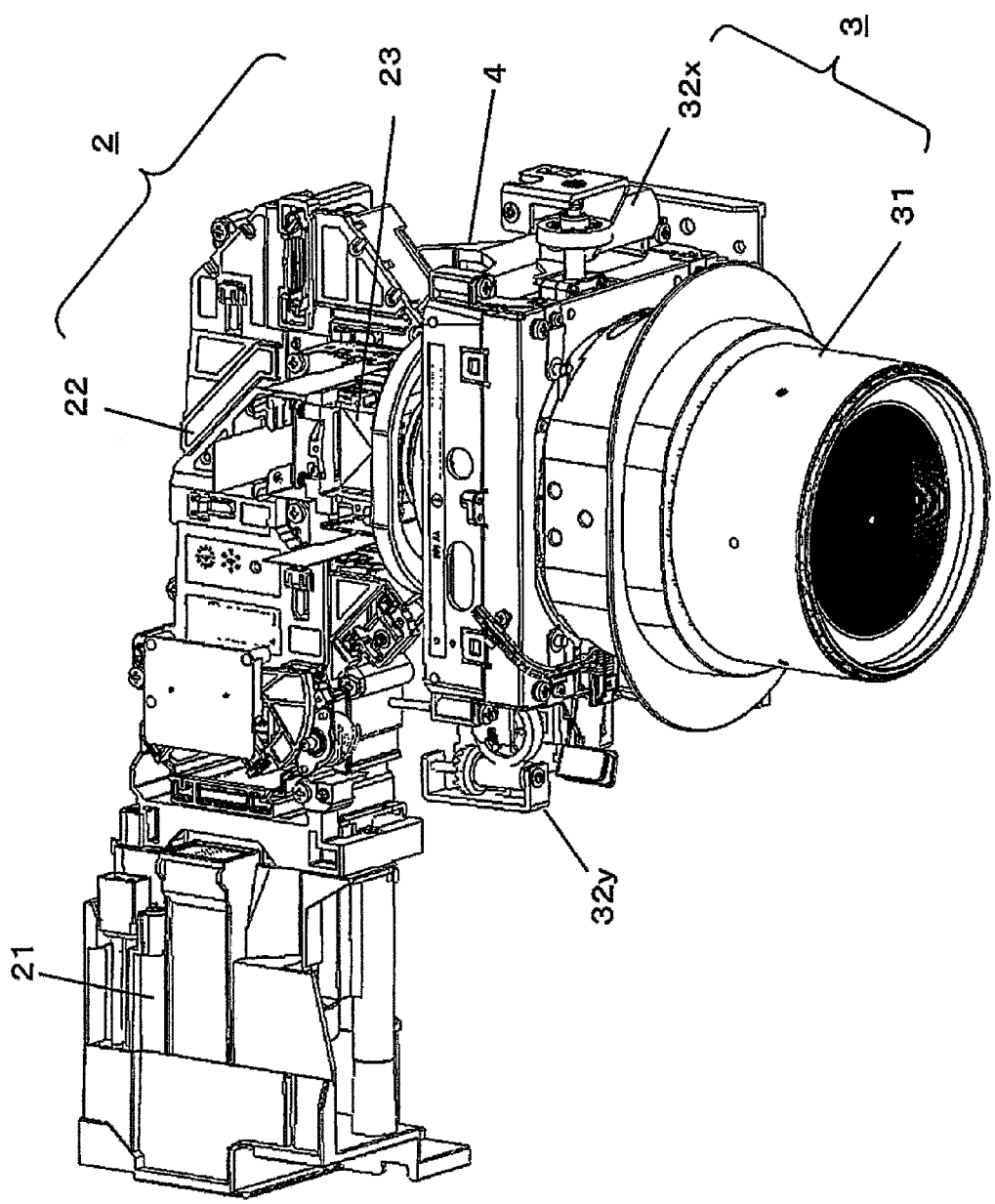
FIG. 2 is a diagram showing an optical engine and a projection optical system.
Figure 3:
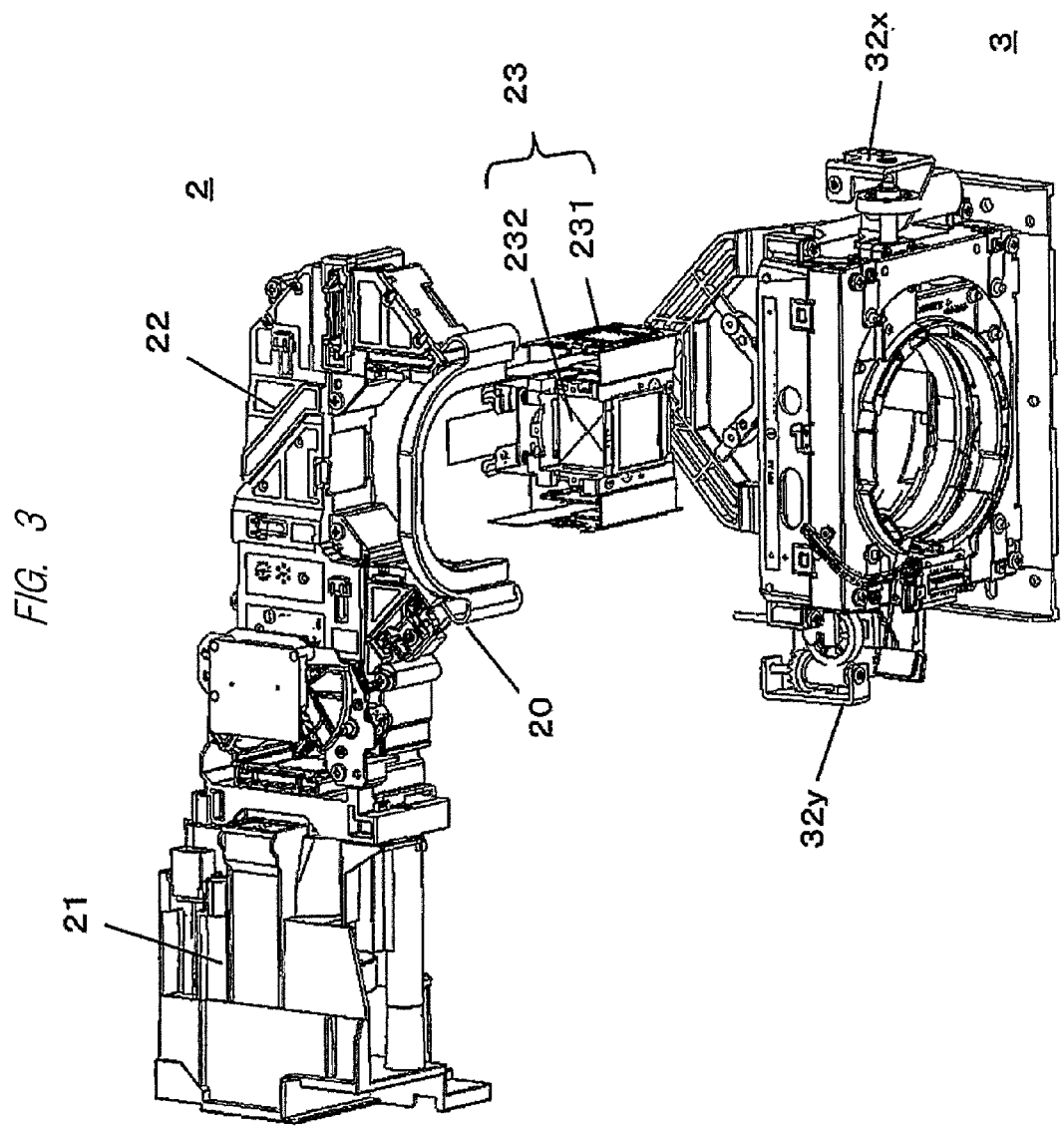
FIG. 3 is a diagram showing a state where an optical engine and a projection optical system are detached from a common base.

FIG. 2 is a diagram showing a state where the optical engine 2 and the projection optical system 3 are taken out of the housing 1 and FIG. 3 is a diagram showing a state where the optical engine 2 and the projection optical system 3 are detached from a common base 4 (illustration of a projection lens 31 is omitted). The optical engine 2 and the projection optical system 3 are mounted on and fixed to the common base 4.

The optical engine 2 is composed of a light source unit 21, a color separating optical system 22, and a color synthesizing optical system 23. These components are housed in a cylindrical light guide 20 and are respectively fixed to predetermined positions. The light source unit 21 is a light source such as an ultra-high pressure mercury lamp and emits substantially white light. The color separating optical system 22 separates the substantially white light into lights of the three primary colors of R, G and B and guides each of the lights of the three primary colors to each corresponding liquid crystal panel. The color synthesizing optical system 23 has liquid crystal panels 231 for R, G and B and a cross dichroic prism 232, and forms respective images based on RGB signals and performs color synthesis of these images.

The projection optical system 3 is composed of a projection lens 31 and a lens shift mechanism 32. Image light emitted from the color synthesizing optical system 23 is enlarged by the projection lens 31 and is projected onto a screen or the like. The lens shift mechanism 32 holds the projection lens 31 and moves the projection lens 31 in two axial directions perpendicular to an optical axis (projection direction), and includes a horizontal-direction (X-direction) driving unit 32x and a vertical-direction (Y-direction) driving unit 32y. The projection lens 31 is fixed to lens attachment surfaces of the lens shift mechanism 32. Thus, a position of an image to be projected onto the screen can be adjusted by moving it in a horizontal direction and a vertical direction.

In the present embodiment, attachment and locking of the projection lens to the lens shift mechanism and detachment and unlocking of the projection lens are each achieved by one operation. A method thereof will be described in detail below with reference to the drawings.

Figure 4:
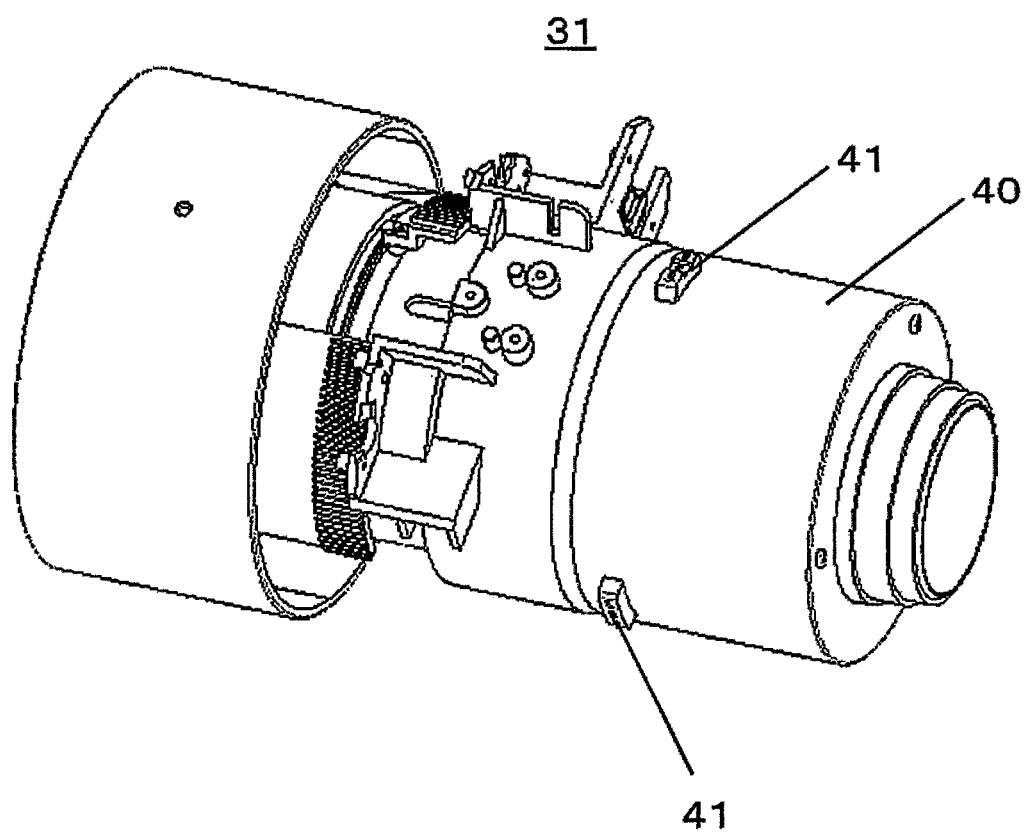
FIG. 4 is a diagram showing a projection lens.

FIG. 4 is a diagram showing the projection lens 31. A plurality of convex portions 41 are disposed in different phases on a circumference of a mirror cylinder 40 of the projection lens 31.

Figure 5:
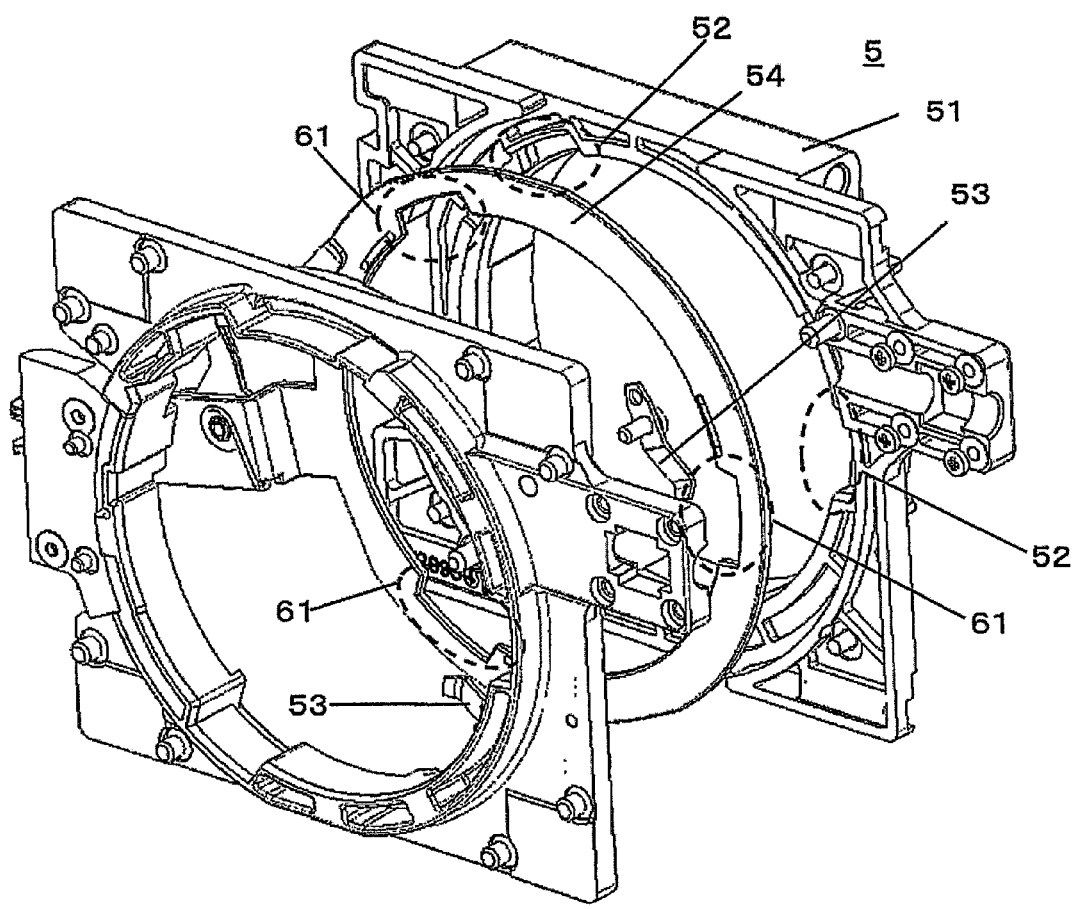
FIG. 5 is a diagram showing an interchangeable lens holding unit.

FIG. 5 is a diagram showing an interchangeable lens holding unit 5. The interchangeable lens holding unit 5 is composed of a lens attachment unit 51 for holding the inserted projection lens 31, lens attachment surfaces 52 formed in a recessed shape in the lens attachment unit 51 and having the same phase as the convex portions 41, a spring 53, and a lens fixing plate 54 which is urged in an optical axis direction by the spring 53 toward the lens attachment surface 52.

The lens fixing plate 54 has concave notch portions 61 having the same phase as the convex portions 41, and attaches and detaches the projection lens 31 in a state where the notch portions 61 and the lens attachment surfaces 52 are matched in phase. When the convex portions 41 are fitted in the lens attachment surfaces 52 and the notch portions 61, the projection lens 31 can be positioned in a rotational direction. The lens fixing plate 54 rotates around an optical axis of the projection lens 31 with respect to the lens attachment unit 51.

Figure 6:
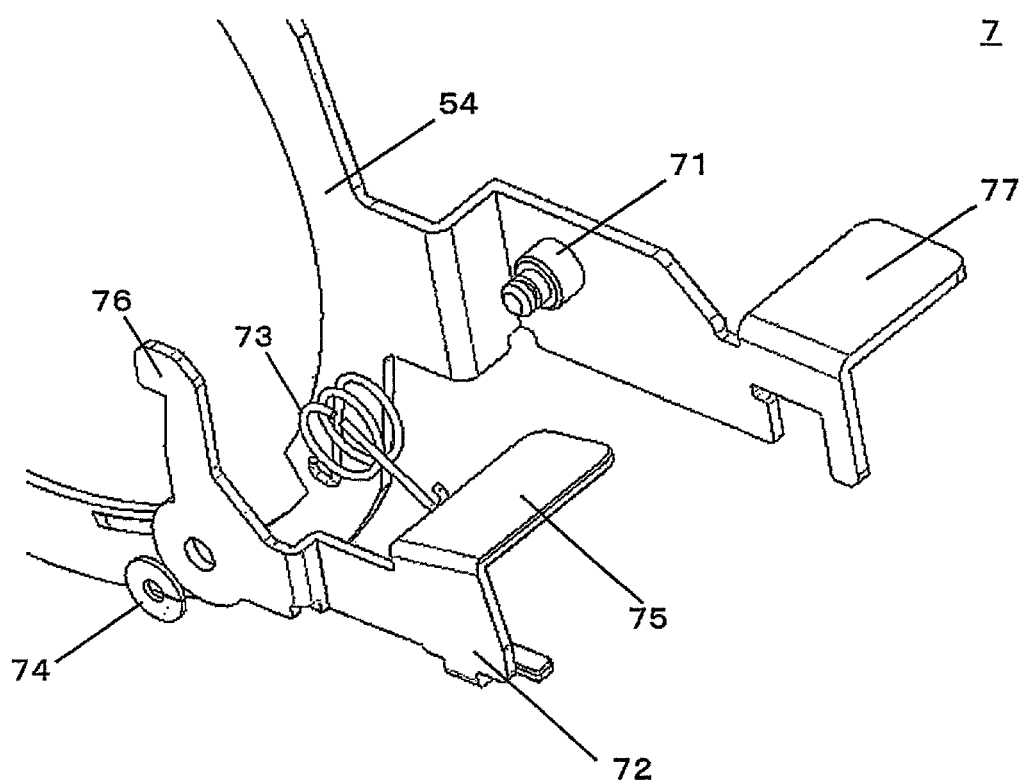
FIG. 6 is a diagram showing a lock unit and a lock plate.

FIG. 6 is a diagram showing a lock unit 7 constituting a part of the lens fixing plate 54 and a lock plate 72. A state viewed from an opposite side of FIG. 5 is shown here.

In the lock unit 7, a pin 71 connected to the lock plate 72 and serving as a rotation axis of the lock plate 72 is swaged. Also, the lock unit 7 includes a lever 77.

The lock plate 72 has a hook shape and includes an urging spring 73, an E ring 74, a tab 75, and a hook 76. The lock unit 7 is provided to prevent the projection lens 31 from dropping off by the rotation of the lens fixing plate 54 due to vibration or the like. The lock plate 72 rotates around the pin 71 and is urged by the urging spring 73 in a locking direction.

Figure 7:
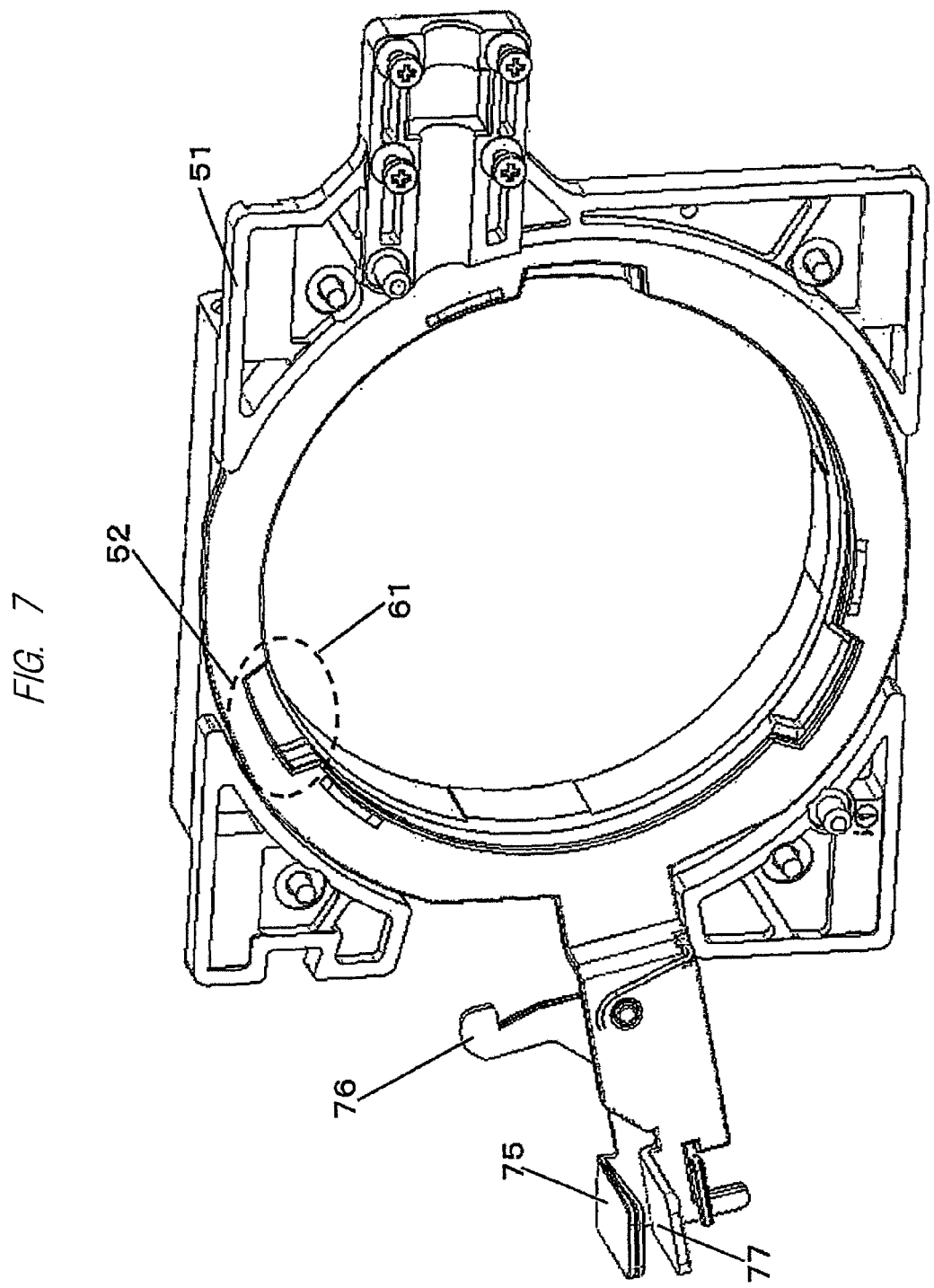
FIG. 7 is a diagram showing a state where lens attachment surfaces and notch portions of a lens fixing plate are in phase.

FIG. 7 is a diagram showing a state where the lens attachment surfaces 52 and the notch portions 61 are in phase. In this state, the projection lens 31 is inserted.

Figure 8:
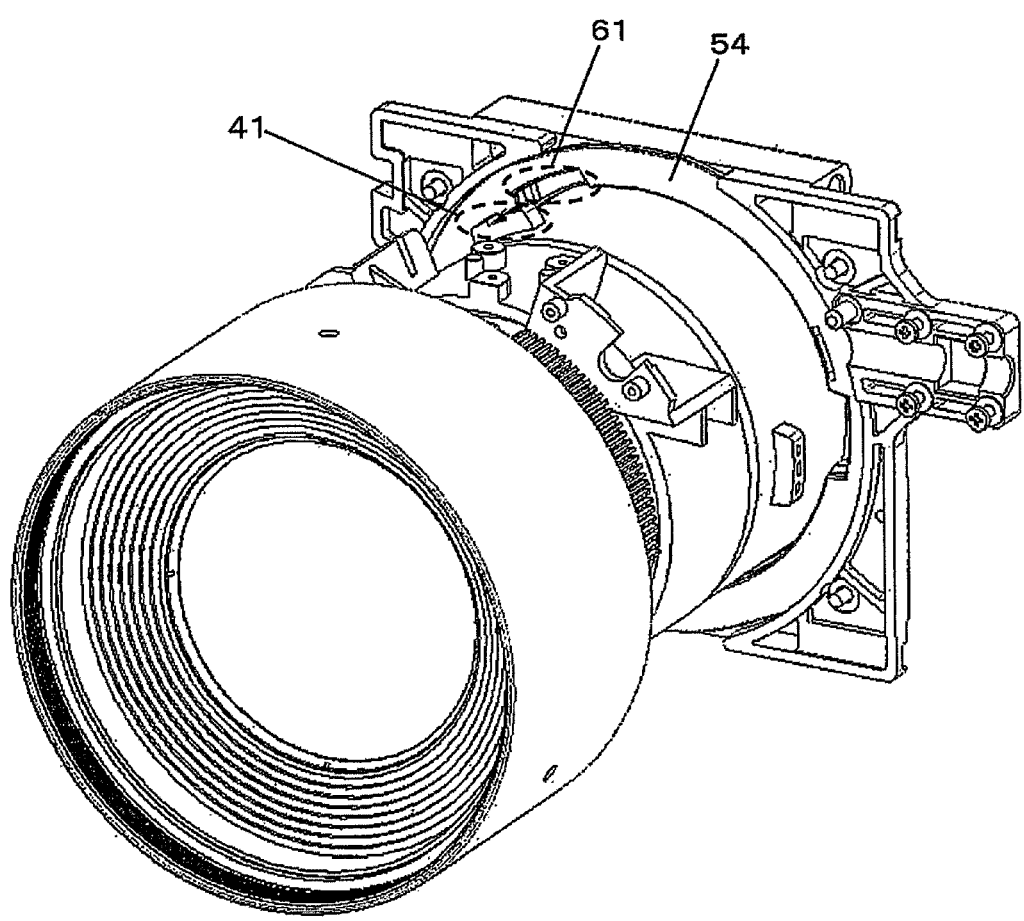
FIG. 8 is a diagram showing a state where a projection lens is inserted into a lens attachment unit.

FIG. 8 is a diagram showing a state where the projection lens 31 is inserted into the lens attachment unit 51. The convex portions 41 are inserted so as to be fitted in the lens attachment surfaces 52 and the notch portions 61. Then, when the lever 77 is pushed up, the lens fixing plate 54 rotates rightward in the drawing, so that the convex portions 41 and the notch portions 61 deviate in phase.

Figure 9:
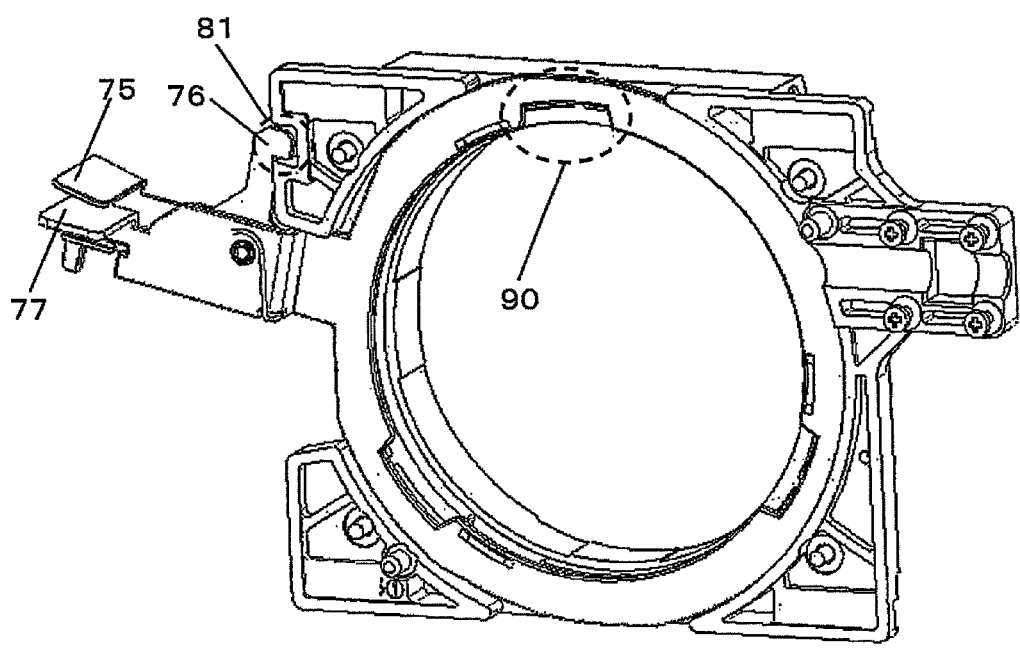
FIG. 9 is a diagram showing a state where a projection lens is fixed and locked.

FIG. 9 is a diagram showing a state where the projection lens 31 is fixed and locked (illustration of the projection lens 31 is omitted). A reference numeral 90 in the drawing denotes a state where the convex portion 41 and the notch portion 61 are out of phase.

The lens attachment unit 51 has a concave portion 81 on which the hook 76 is to be hung. When the lever 77 is pushed up, the lens fixing plate 54 rotates rightward in the drawing, so that the hook 76 is hung on the concave portion 81 (i.e., the projection lens 31 enters a locked state). In this manner, by just the one operation of rotating the lens fixing plate 54, the convex portions 41 and the notch portions 61 deviate in phase, so that the projection lens 31 is attached to the lens attachment unit 51 and enters the locked state.

Also, when the tab 75 is pushed down in the locked state, the lens fixing plate 54 rotates leftward in the drawing, so that the hook 76 being hung comes off the concave portion 81 (i.e., the locked state is released). Then, when the tab 75 is further pushed down, the tab 75 comes in contact with the lever 77, and these are pushed down together. As a result, the lock plate 72 and the lens fixing plate 54 rotate together, and the state 90 in FIG. 9 returns to a state where the notch portions 61 and the convex portions 41 are in phase.

As described above, the attachment and the locking of the projection lens 31 can be achieved by one operation of pushing up the lever 77, and the detachment and the unlocking of the projection lens 31 can be achieved by one operation of pushing down the tab 75.

According to the present embodiment, an operation for attaching and detaching the projection lens can be performed by one action with a simple mechanism. More specifically, an operation for attaching and locking the projection lens or an operation for detaching and unlocking the projection lens can be performed by one action seamlessly without any distinction. As a result, operability of a user can be significantly improved and the number of components can be reduced to achieve the cost reduction.

DESCRIPTION OF REFERENCE SIGNS

1 . . . housing, 2 . . . optical engine, 3 . . . projection optical system, 20 . . . light guide, 21 . . . light source unit, 22 . . . color separating optical system, 23 . . . color synthesizing optical system, 231 . . . liquid crystal panel, 232 . . . cross dichroic prism, 31 . . . projection lens, 32 . . . lens shift mechanism, 40 . . . mirror cylinder of projection lens, 41 . . . convex portion of mirror cylinder of projection lens, 51 . . . lens attachment unit, 52 . . . lens attachment surface, 53 . . . spring, 54 . . . lens fixing plate, 61 . . . notch portion of lens fixing plate, 7 . . . lock unit, 71 . . . pin, 72 . . . lock plate, 73 . . . urging spring, 74 . . . E ring, 75 . . . tab, 76 . . . hook, 77 . . . lever, 81 . . . concave portion of lens attachment unit

The invention claimed is:

1. A projection image display apparatus comprising:
an optical engine which irradiates a display element with light emitted from a light source to form an image;
a projection lens which enlarges and projects the image emitted from the optical engine;
a lens shift mechanism for adjusting a position of an image to be projected onto a screen;
a lens attachment unit for attaching the projection lens to the lens shift mechanism; and
a first plate for attaching the projection lens to the lens attachment unit to achieve a locked state,
wherein the attachment of the projection lens to the lens attachment unit and the achievement of the locked state are performed by only rotation of the first plate in a first direction,
wherein the first plate is connected to a second plate for putting the projection lens into the locked state via an urging spring,
wherein the lens attachment unit includes a third concave portion for connection with the second plate,
wherein the second plate includes a hook for connection with the lens attachment unit,
wherein the hook is hung on the third concave portion by the rotation of the first plate in the first direction,
wherein the locked state is a state where the hook is hung on the third concave portion,
wherein the first plate includes a lever for rotating the first plate in the first direction,
wherein the second plate includes a tab for rotating the first plate in a second direction opposite the first direction,
wherein the locked state caused by fitting the hook into the third concave portion and fixation of the projection lens are achieved by only the rotation of the first plate in the first direction due to a force applied to the lever, and
release of the locked state and detachment of the projection lens are achieved by only rotation of the second plate in the second direction opposite to the first direction due to a force applied to the tab.

2. The projection image display apparatus according to claim 1,
wherein the lens attachment unit includes a first concave portion for attaching the projection lens,
the first plate includes a second concave portion for attaching the projection lens to the lens attachment unit,
the projection lens includes a convex portion for fitting into the lens attachment unit and the first plate, and
when the convex portion is fitted in the first and second concave portions and then deviates in phase from the second concave portion, the projection lens is attached to the lens attachment unit.

\* \* \* \* \*